US012280328B2

(12) United States Patent
Jodi et al.

(10) Patent No.: US 12,280,328 B2
(45) Date of Patent: Apr. 22, 2025

(54) AIR OIL SEPARATOR (71) Applicant: Donaldson Company, Inc., Minneapolis, MN (US)

(72) Inventors: Wijadi Jodi, Burnsville, MN (US); Timothy O. Winters, Nowthen, MN (US); Scott R. Galloway, Chanhassen, MN (US); Marvin E. Laue, Belle Plaine, MN (US); Hubert J. Visee, Eden Prairie, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 594 days.

(21) Appl. No.: 17/613,438

(22) PCT Filed: May 18, 2020

(86) PCT No.: PCT/US2020/033440
§ 371 (c)(1),
(2) Date: Nov. 22, 2021

(87) PCT Pub. No.: WO2020/236737
PCT Pub. Date: Nov. 26, 2020

(65) Prior Publication Data
US 2022/0305421 A1 Sep. 29, 2022

(51) Int. Cl.
*B01D 46/24* (2006.01)
*B01D 46/00* (2022.01)

(52) U.S. Cl.
CPC ..... *B01D 46/2414* (2013.01); *B01D 46/0031* (2013.01); *B01D 2265/021* (2013.01); *B01D 2265/026* (2013.01); *B01D 2271/027* (2013.01)

(58) Field of Classification Search
CPC .............. B01D 46/2414; B01D 46/003; B01D 46/0031; B01D 2265/021; B01D 2265/026; B01D 2271/027
See application file for complete search history.

(56) References Cited

U.S. PATENT DOCUMENTS

| D638,034 S | 5/2011 | Jiang et al. |
| 2004/0031252 A1* | 2/2004 | Heikamp ........... B01D 46/4209 55/486 |

(Continued)

FOREIGN PATENT DOCUMENTS

| CA | 2947289 A1 | 5/2017 |
| DE | 202006002383 U1 | 7/2006 |

(Continued)

OTHER PUBLICATIONS

International Search Report and Written Opinion for PCT/US2020/033440 (Sep. 11, 2020).

(Continued)

*Primary Examiner* — Robert Clemente
(74) *Attorney, Agent, or Firm* — Merchant & Gould P.C.

(57) ABSTRACT

An air oil separator includes a removable and replaceable filter element. The filter element can include a flange-receiving recess in a first end cap construction. Alternatively, the first end cap construction can include alternating radially protruding projections and radially inward recesses. Alternatively, the end cap construction can include a first section contained within a plane and a second section sloping from the first section.

8 Claims, 11 Drawing Sheets

(56) References Cited

U.S. PATENT DOCUMENTS

| | | | |
|---|---|---|---|
| 2004/0035094 A1* | 2/2004 | Jersey | B01D 46/2414 55/498 |
| 2004/0068970 A1* | 4/2004 | Hasegawa | B01D 46/2414 55/498 |
| 2006/0254229 A1* | 11/2006 | Schrage | B01D 46/0004 55/498 |
| 2009/0249754 A1* | 10/2009 | Amirkhanian | B01D 46/88 55/357 |
| 2010/0154372 A1 | 6/2010 | Bittle et al. | |
| 2014/0157738 A1 | 6/2014 | Eberle | |
| 2014/0338295 A1 | 11/2014 | Dworatzek | |
| 2015/0101298 A1* | 4/2015 | Osendorf | B01D 46/527 55/502 |
| 2016/0256813 A1 | 9/2016 | Dworatzek et al. | |
| 2016/0348550 A1 | 12/2016 | Zuerker et al. | |
| 2020/0030724 A1 | 1/2020 | Bautz et al. | |
| 2020/0164299 A1* | 5/2020 | Louison | B01D 46/0005 |
| 2020/0384402 A1* | 12/2020 | Schwartz | B01D 46/0005 |
| 2021/0046415 A1* | 2/2021 | Tiffany | B01D 46/527 |

FOREIGN PATENT DOCUMENTS

| | | | |
|---|---|---|---|
| DE | 102017003489 A1 | 10/2018 | |
| DE | 102018123413 A1 | 4/2019 | |
| JP | 60151517 U | 10/1985 | |
| JP | 2000177764 A | 6/2000 | |
| JP | 2006116541 A | 5/2006 | |
| WO | WO-9937386 A1 * | 7/1999 | B01D 46/003 |
| WO | 2009019442 A1 | 2/2009 | |
| WO | 2013/024105 A1 | 2/2013 | |
| WO | 2013/063497 A1 | 5/2013 | |

OTHER PUBLICATIONS

Chinese Office Action for Application No. 202080035911.1 mailed Sep. 16, 2023.

Japanese Office Action for Application No. 2021-560739 dated May 17, 2024.

* cited by examiner

AIR OIL SEPARATOR

This application is a US National Stage application of International PCT application No. PCT/US2020/033440, filed May 18, 2020, which claims the benefit of priority under 35 USC § 119 (e) to U.S. Provisional Patent Application Ser. No. 62/850,304 filed May 20, 2019, which applications are incorporated herein by reference. To the extent appropriate, a claim of priority is made to each of the above disclosed applications.

TECHNICAL FIELD

This disclosure relates to the gas/liquid separation. This disclosure particularly concerns and air oil separator for use in air compressors.

BACKGROUND

Certain air oil separators, for example as used with air compressors, include two components: a vessel or tank with a cover; and a removable and replaceable separator element. In some assemblies, a single separator element is used, while in others, multiple elements are used. In general, operation involves directing a gas/liquid flow (e.g., air entrained with oil) into the tank. The gas flow is eventually directed through the filter element, and within the filter element liquid coalescing and drainage occurs. As a result, entrained liquid concentration, within the air, is reduced. Periodically, the filter element is removed and replaced with a new filter element.

SUMMARY

In one aspect, a filter element for an air oil separator is provided. The filter element comprises a tubular construction of filter media having opposite first and second ends and a longitudinal axis; and a first end cap construction secured to the first end of the filter media; the first end cap construction including a flange-receiving recess therein.

In various example embodiments:
  the first end cap construction includes an axial plate and an annular sleeve extending perpendicular from the plate in a direction toward the filter media; the annular sleeve having an outer radial ring and an inner radial ring; the filter media being between the outer radial ring and the inner radial ring.
  the recess is defined by the annular sleeve.
  the recess is defined by the outer radial ring.
  the recess is a longitudinally extending recess generally parallel to the longitudinal axis.
  the recess is defined by the axial plate.
  the axial plate has an upper surface and an opposite lower surface, the lower surface facing the filter media; and the recess is a continuous ring in the lower surface of the plate.
  the upper surface of the plate includes an axially extending rib forming a continuous ring.
  the recess has a cross-section with a shape of any one of: rounded, polygon, trapezoidal, curved, or irregular.

In another aspect, an air oil separator assembly is provided including a tank with a surrounding wall defining an interior volume, an open mouth in communication with the interior volume, and a closed bottom; the tank further including, (i) an inlet extending through the wall; (ii) a lower liquid sump in the interior volume held by the closed bottom; and a flange circumscribing the mouth; the flange having a projection therefrom; a cover removably mounted on the tank over the mouth to provide selective access to the interior volume; and the filter element as variously characterized above removably positioned in the interior volume; the projection on the flange of the tank extending into the flange-receiving recess of the end cap construction.

In various example embodiments:
  a first seal member between and against the flange of the tank and the end cap construction; and a second seal member between and against the end cap construction and the cover.
  the first end cap construction includes an axial plate and an annular sleeve extending perpendicular from the plate in a direction toward the filter media; the annular sleeve having an outer radial ring and an inner radial ring; the filter media being between the outer radial ring and the inner radial ring; and the recess is a longitudinally extending recess parallel to the longitudinal axis and is defined by the outer radial ring; and the projection on the flange extends radially inwardly into the mouth.
  the first end cap construction includes an axial plate and an annular sleeve extending perpendicular from the plate in a direction toward the filter media; the annular sleeve having an outer radial ring and an inner radial ring; the filter media being between the outer radial ring and the inner radial ring; the axial plate has an upper surface and an opposite lower surface, the lower surface facing the filter media; the recess is a continuous ring in the lower surface of the plate; and the projection on the flange extends axially upwardly into the continuous ring of the recess.
  the upper surface of the plate includes an axially extending rib forming a continuous ring; and the cover includes a continuous recess receiving the rib of the upper surface of the plate.
  wherein the projection on the flange has a cross-section with a shape of any one of: rounded, polygon, trapezoidal, curved, or irregular.

In another aspect, a filter element for an air oil separator is provided; the filter element comprising: (a) a tubular construction of filter media having opposite first and second ends and a longitudinal axis; and (b) a first end cap construction secured to the first end of the filter media; the first end cap construction including a plurality of alternating radially outward projections and radially inward recesses.

In various example embodiments:
  the first end cap construction includes an axial plate and an annular sleeve extending perpendicular from the plate in a direction toward the filter media; the annular sleeve having an outer radial ring and an inner radial ring; the filter media being between the outer radial ring and the inner radial ring.
  wherein the alternating projections and recesses are along a radial outer periphery of the axial plate.
  wherein the projections and recesses are curved surfaces.
  wherein at least one of the projections extends radially outwardly more than a majority of a remainder of the projections.
  wherein one of the projections extends radially outwardly more all of a remainder of the projections.

In another aspect, an air oil separator assembly is provided comprising: a tank with a surrounding wall defining an interior volume, an open mouth in communication with the interior volume, and a closed bottom; the tank further including, an inlet extending through the wall; a lower liquid sump in the interior volume held by the closed bottom; and a flange circumscribing the mouth; the flange having a lid-engaging section and an element engaging section; the element engaging section being axially recessed from and radially inward of the lid-engaging section; the element engaging section having a groove holding a seal member therein; each of the lid engaging section and element engaging section having a plurality of alternating radially inward protrusions and radially outward depressions; a cover removably mounted on the lid-engaging section of the tank flange over the mouth to provide selective access to the interior volume; and the filter element as variously characterized above removably positioned in the interior volume with a portion of the end cap construction axially against the seal member in the element engaging section of the tank flange, and being circumscribed by the lid engaging section; the radial outward projections of the end cap being received by the depressions in the lid engaging section; and the radial inward recesses of the end cap receiving the protrusions of the lid engaging section.

In various example embodiments:
 the lid engaging section includes a plurality of fastener holes in an axial section thereof; and the lid includes axially extending fasteners removably mounted in the fastener holes.
 wherein the groove and seal member form a wavy ring.

In another aspect, a filter element for an air oil separator is provided including a tubular construction of filter media having opposite first and second ends and a longitudinal axis; and a first end cap construction secured to the first end of the filter media; the first end cap construction having an outer radial portion including: a continuous extension extending radially outwardly from an outward diameter of the filter media; the continuous extension having a first section defining an outer periphery of the extension and a second section between the first section and the outer diameter of the filter media; the first section being contained within a plane perpendicular to the longitudinal axis; and the second section sloping from the first section in a direction toward the second end of the filter media.

In an example embodiments:
 the first end cap construction further includes a centering ring radially inward from an inner diameter of the filter media; the centering ring defining an opening in communication with an interior of the tubular construction of filter media.
 a closed second end cap secured to the second end of the filter media.

In another aspect, an air oil separator assembly is provided including a tank with a surrounding wall defining an interior volume, an open mouth in communication with the interior volume, and a closed bottom; the tank further including, an inlet extending through the wall; a lower liquid sump in the interior volume held by the closed bottom; and a flange circumscribing the mouth; the flange having a first radially outward surface and a frusto-conical surface; the frusto-conical surface being between the first surface and an inner diameter of the flange; the filter element of as variously characterized above positioned in the interior volume with the first section of the end cap construction being against the first surface of the flange; and the second section of the end cap construction being within a received by the frusto-conical surface of the flange; and a cover removably mounted on the tank over the mouth to provide selective access to the interior volume; the cover having an element engaging side with an axial protrusion extending into and being received by the second section of the end cap construction.

In an example embodiment, a first seal member between the second section of the end cap construction and the cover; and a second seal member between the second section of the end cap construction and the flange.

It is noted that not all of the specific features described herein need to be incorporated in an arrangement for the arrangement to have some selected advantage according to the present disclosure.

DETAILED DESCRIPTION

Figure 20:
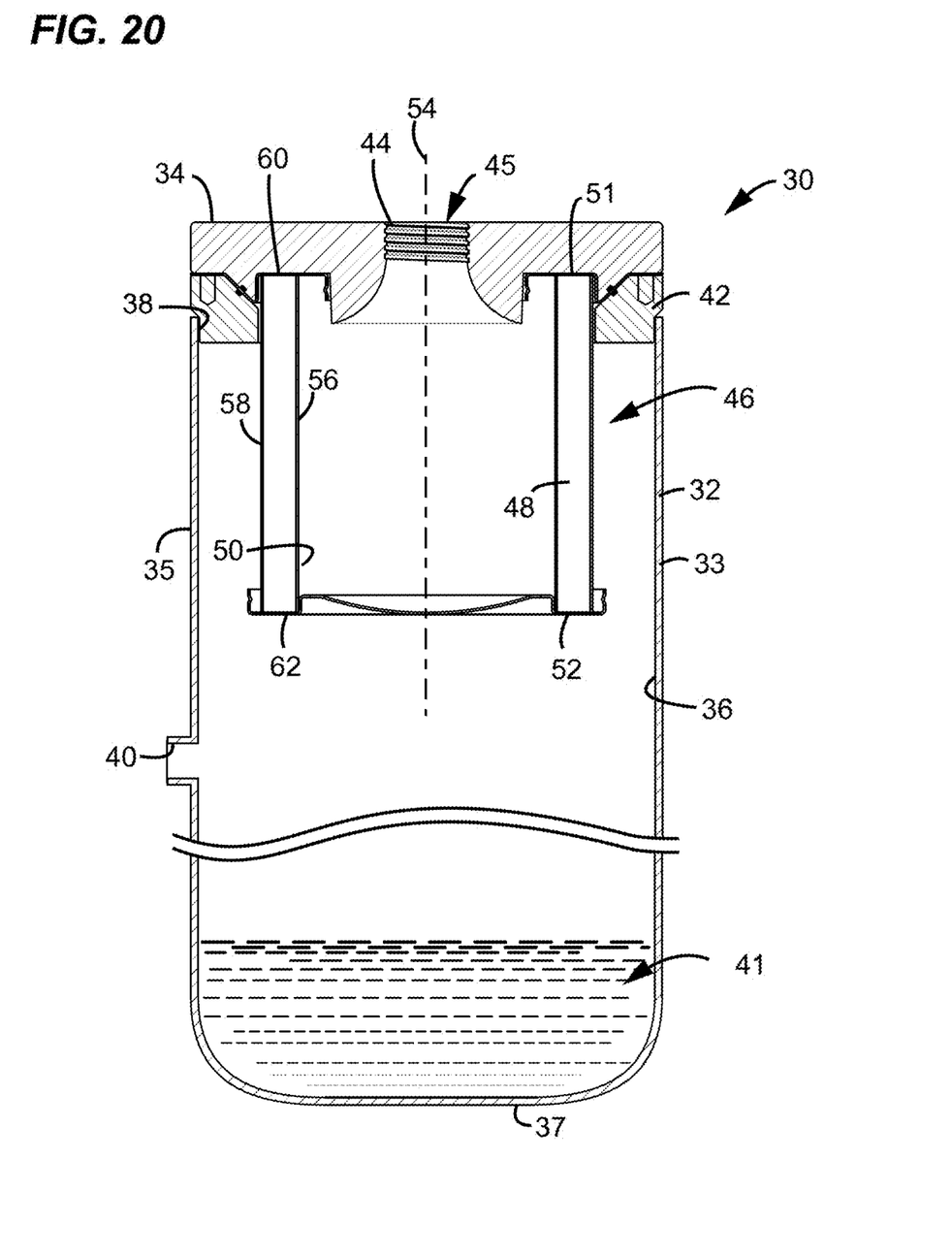
FIG. 20 is a cross-sectional view of an air oil separator assembly, showing the tank, filter element, and cover.
Figure 21:
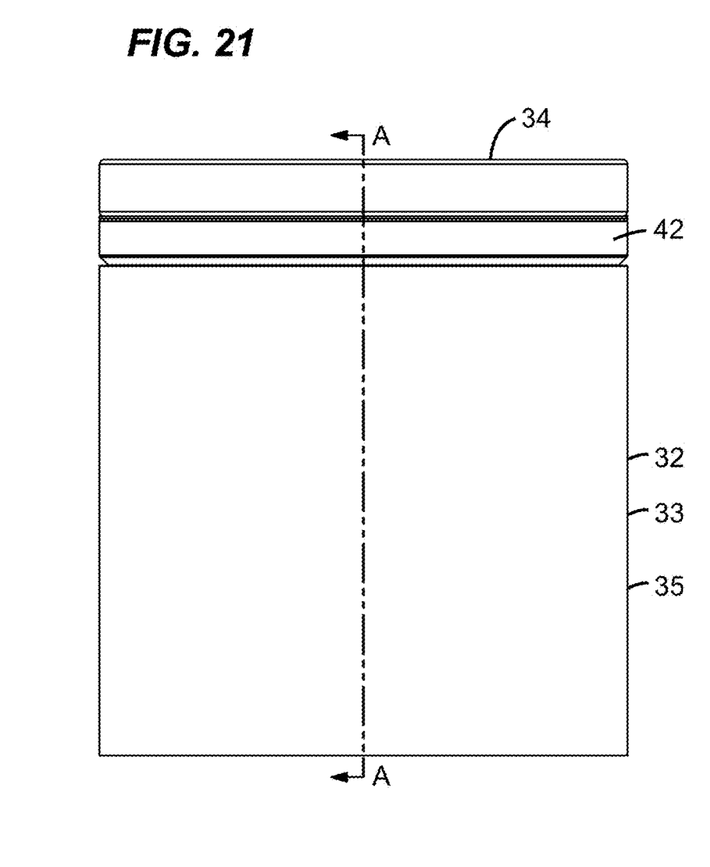
FIG. 21 is a front, elevational view of a portion of the air oil separator assembly of FIG. 20.
Figure 22:
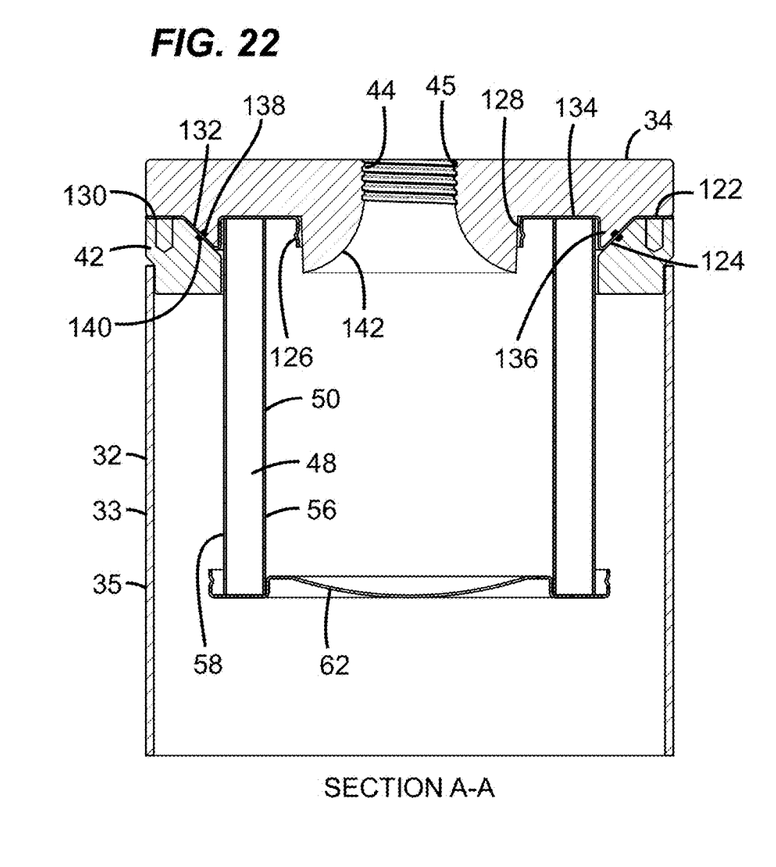
FIG. 22 is a cross-sectional view of the air oil separator assembly of FIGS. 20 and 21, the cross section being taken along the line A-A of FIG. 21.
Figure 23:
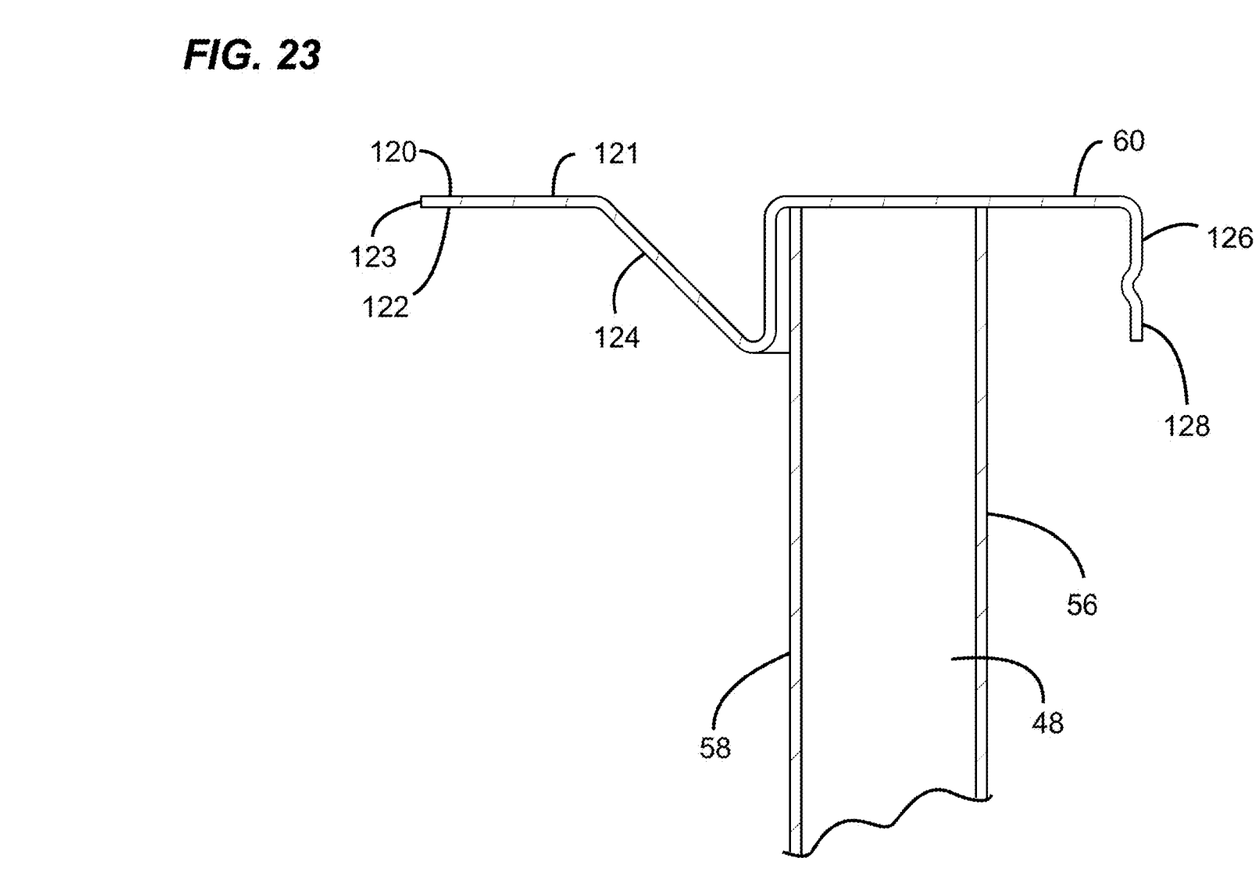
FIG. 23 is a schematic, cross-sectional view of a portion of the air oil separator assembly of FIGS. 20-22.

Turning first to FIG. 20, an example embodiment of an air oil separator assembly is shown generally at 30. The assembly 30 includes a vessel or tank 32. The tank 32 includes a housing 33 and a cover 34.

The housing 33 has a surrounding wall 35 that defines an interior volume 36. The housing 33 has a closed bottom 37 and an open mouth 38 in communication with the interior volume 36.

The tank 32 further includes an inlet 40 extending through the wall 35. The inlet 40 takes in an oil-entrained air stream into the interior volume 36.

A lower liquid sump 41 is in the interior volume 36 and held by the closed bottom 37. The liquid sump 41 is typically coalesced oil that is has been removed from the air stream being brought into the assembly 30.

The tank 32 further includes a flange 42. The flange 42 circumscribes the mouth 38.

The cover 34 is removably mounted on the tank 32 and over the mouth 38 to provided selective access to the interior volume 36. In FIG. 20, the cover 34 is positionable on the flange 42. In the FIG. 20 embodiment, the cover 34 has an opening 44. The opening 44 can be an air flow outlet 45. In other embodiments, the cover 34 has no openings (e.g., is closed), and the air flow outlet is in a different part of the air oil separator assembly 30.

Positioned within the interior volume 36 of the tank 32 is a removable and replaceable filter element 46. The filter element 46 will separate gas from liquid (e.g. air from oil) that is being brought into the tank 32 through the inlet 40. The air and oil inlet stream flows into the inlet 40 and into the interior volume 36. From there, it passes through the filter element 46. The filter element 46 separates the air from the oil, and coalesces the oil causing it to drain to the bottom of the tank 32 and be collected in the sump 41. The air that has had the oil removed then exits the tank 32 through the outlet 45.

In general, the filter element 46 includes a tubular construction of filter media 48. The filter media 48 can often be a pleated media formed in a cylinder. In the interior of the tubular construction of media 48 is a filter interior 50, which is typically a clean air volume.

The filter media 48 has opposite first and second ends 51, 52. The filter element 50 further has a longitudinal axis 54 extending along the length thereof. In the example shown in FIG. 20, the longitudinal axis 54 passes through a center of the filter interior 50 and is perpendicular to a plane containing the first end 51 and perpendicular to a plane containing the second end 52.

The filter media 48, as mentioned previously, is typically a type of filter media that will separate oil from a gas stream. The filter media 46 can be embodied as a media configuration, having multiple layered media grades and types.

The filter media will typically cause the oil within the gas stream to coalesce, which will then form droplets and drip by gravity into the sump 41. The media 48 can be a pleated media, but can include non-pleated as well. When pleated media is use, a direction of the pleats extend parallel to the longitudinal axis 54 in a direction between the first and second ends 51, 52. In this example, the flow through the filter element 46 is from the outside, through the media 48 and then into the filter interior 50. From the filter interior 50, it exits the assembly 30 through the outlet 45. Other arrangements can include the flow through the element 46 from the inside to the outside.

The filter media 48 will often be supported by at least an inner liner 56. The inner liner 56 will help prevent the collapse of the pleats of the media 48. The filter element 46 can further include an outer liner 58. The outer liner 58 is along an outer diameter of the pleated media 48 and extends between the first and second ends 51, 52.

In many examples, the filter element 46 further includes a first end cap construction 60. The first end cap construction 60 is secured to first end 51 of the media 48. Often, secured to a second end 52 of the media 48 is a second end cap 62. In the example shown, the second end cap 62 is a closed end cap.

Various embodiments of variations on the assembly 30 are now described below. Common features will includes the same reference numeral, and will not be defined again.

Turning now to the embodiment of FIGS. 1-4, the filter element 46 includes the first end cap construction 60 as defining a flange-receiving recess therein.

The first end cap construction 60, in this embodiment, includes an axial plate 72 and an annular sleeve 73. The annular sleeve 73 extends perpendicular from the plate 72 in a direction toward the filter media 48. The annular sleeve 73 includes an outer radial ring 74 adjacent to the outer liner 58 and an inner radial ring 75 adjacent to and radially inward of the inner liner 56.

Figure 1:
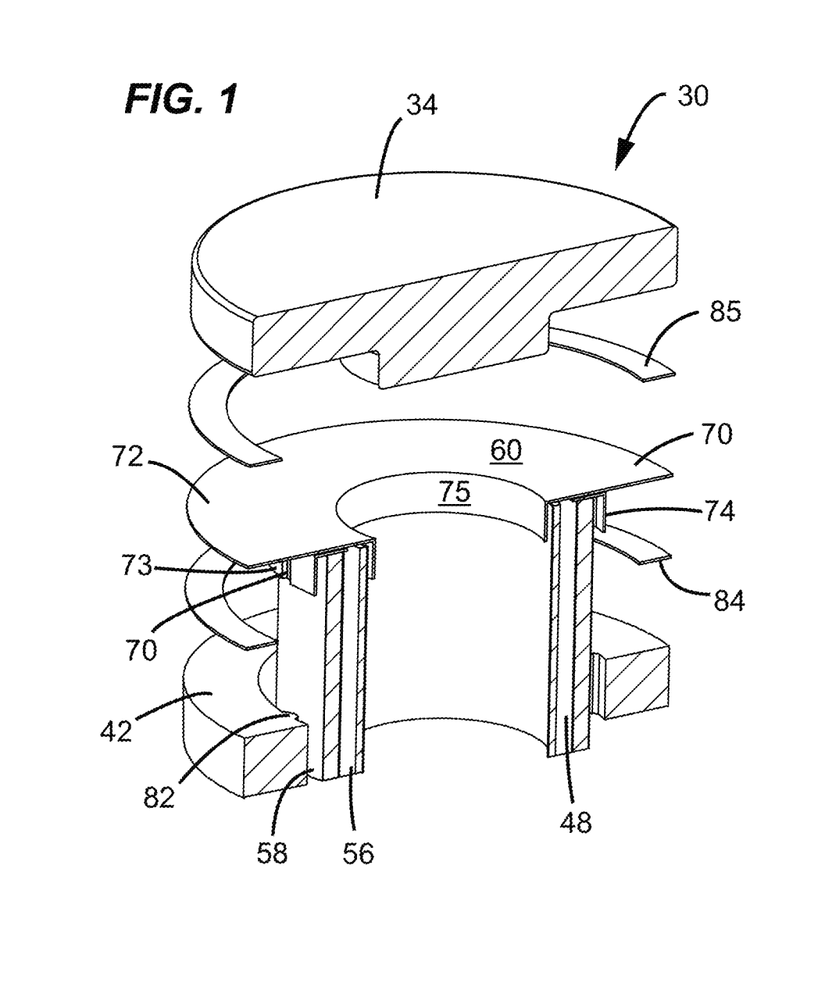
FIG. 1 is an exploded, perspective view of parts of an air oil separator assembly including a filter element, constructed in accordance with principles of this disclosure.
Figure 3:
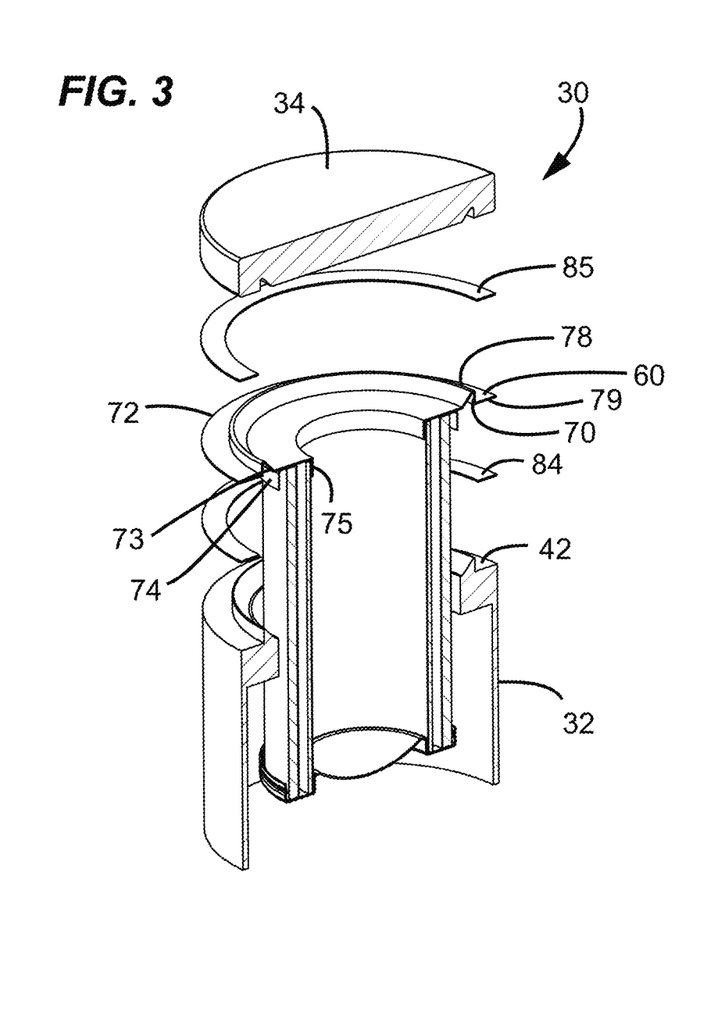
FIG. 3 is an exploded perspective view of another embodiment of an air oil separator assembly including a filter element, constructed in accordance with principles of this disclosure.

As can be seen in FIGS. 1 and 3, the filter media 48 is located between the outer radial ring 74 and the inner radial ring 75.

Figure 2:
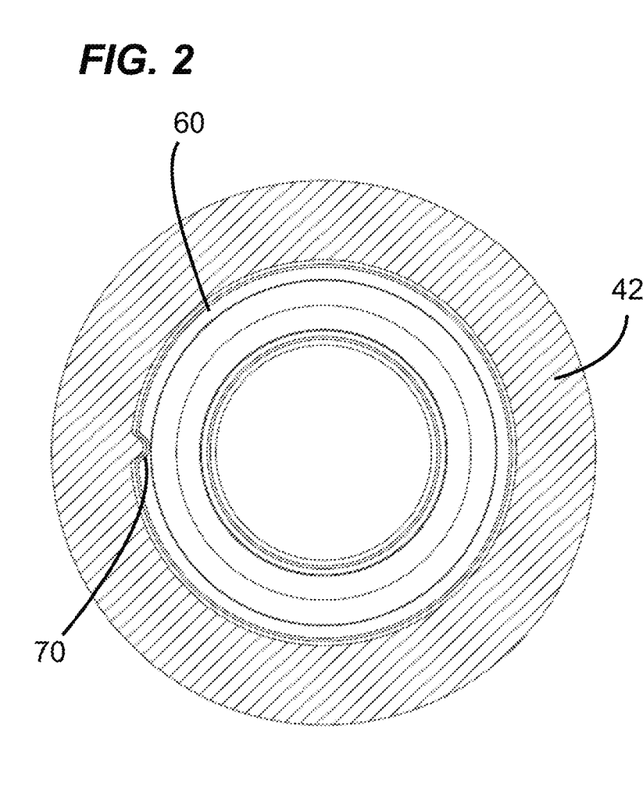
FIG. 2 is a cross-sectional view of the assembly of FIG. 1.

In the embodiment of FIGS. 1 and 2, the recess 70 is defined by the annular sleeve 73. In the example shown, the recess 70 is a longitudinally extending recess generally parallel to the longitudinal axis 54. The recess 70 in the embodiment of FIGS. 1 and 2 is defined by the outer radial ring 74.

Figure 4:
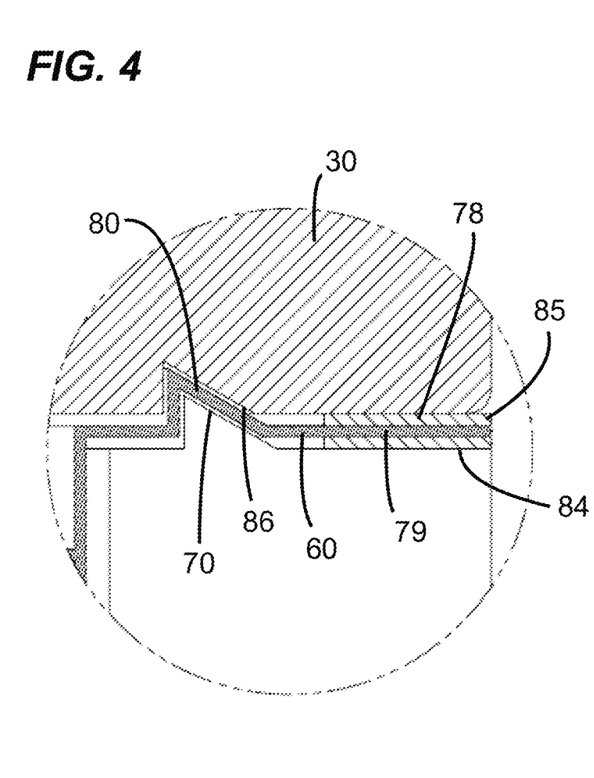
FIG. 4 is a cross-sectional view of a portion of the assembly of FIG. 3
Figure 5:
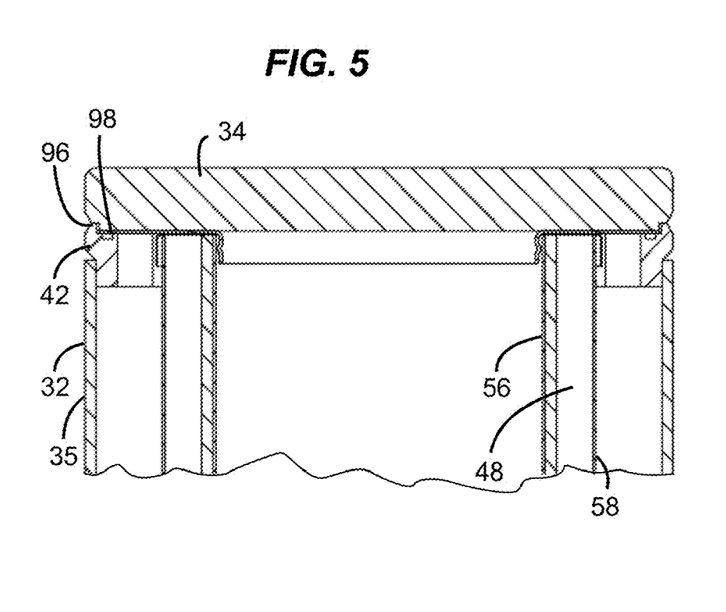
FIG. 5 is a cross-sectional view of another embodiment of an air oil separator assembly.

In the embodiment of FIGS. 3 and 4, the recess 70 is defined by the axial plate 72. In particular, the axial plate 72 includes an upper surface 78 and an opposite lower surface 79. The lower surface 79 faces the filter media 48. The recess 70 is a continuous ring in the lower surface 79 of the plate 72. The upper surface 78 of the plate 72 can include an axially extending rib 80 forming a continuous ring.

In the embodiment of FIGS. 1-4, the recess 70 can include a variety of cross section including, for example, rounded, polygon, trapezoidal, curved, or irregular.

The filter element 46 of the embodiments shown in FIGS. 1-4 can be removably positioned in the interior volume 36 of the tank 32 of an air oil assembly 30. In the air oil assembly 30, the flange 42 of the tank 32 include a projection 82. The projection 82 on the flange 42 extends into the flange-receiving recess 70 of the first end cap construction 60 of the filter element 46.

The air oil separator assembly 30 further includes a first seal member 84 between and against the flange 42 and the first end cap construction 60. The first seal member 84 can include, for example, a gasket or an O-ring. A second seal member 85 is between and against the first end cap construction 60 and the cover 34. The second seal member 85 can be in the form of a gasket or O-ring seal member.

In the embodiment of FIGS. 1 and 2, the projection 82 on the flange 42 extends radially inwardly from the flange 42 and extends radially inwardly into the open mouth 38 of the tank 32. The projection 42 is received by the recess 70 in the outer radial ring 74 of the sleeve 73.

In the embodiment of FIGS. 3 and 4, the projection 82 on the flange 42 extends axially upwardly into the recess 70, which is in the form of continuous ring in the lower surface 79 of the plate 72.

In the embodiment of FIGS. 3 and 4, the cover 34 further includes a continuous recess 86 in the portion of the cover 34 that engages against the flange 42 of the tank 32. The recess 86 in the cover 34 receives the rib 80 of the upper surface 78 of the plate 72.

It should be understood that the projection 82 on the flange 42 can have a cross section of many different shapes including, for example, rounded, polygon, trapezoidal, curved, or irregular.

Turning now to the embodiment of FIGS. 5-19, another example of air oil assembly 30 having tank 32 and filter element 46 is shown. In this embodiment, the filter element 46 has at its first end cap construction 60 a plurality of alternating radially outward projections 90 and radially inward recesses 91. In the example embodiment shown, the alternating projections 90 and recesses 91 are along a radially outward periphery 92 of the axial plate 72 of the first end cap construction 60.

While many embodiments are possible, in the one shown, the projections 90 and recesses 91 are curved surfaces. The projections 90 and recesses 91 give the appearance of a wave.

Figure 9:
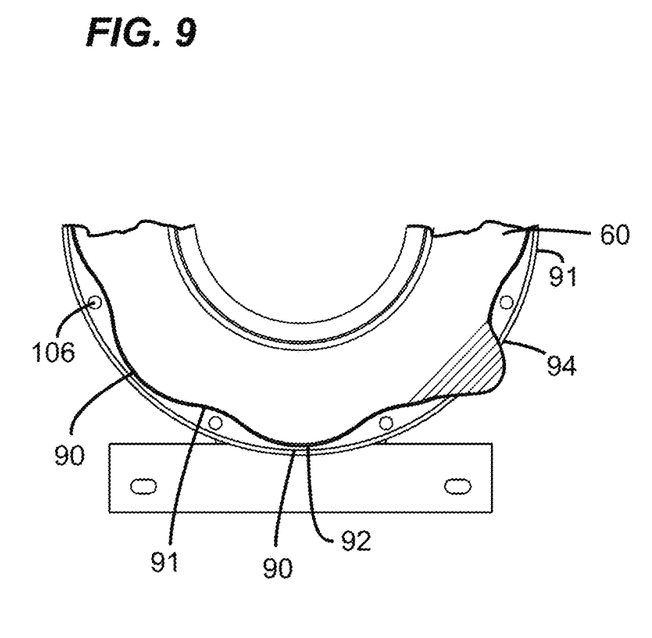
FIG. 9 is a portion of a top plan view of the assembly, similar to FIG. 7, but showing a variation.

Attention is directed to FIG. 9. In FIG. 9, there is at least one of the projections that extends radially outwardly more than a majority of remainder of the projections 90. In the example shown, only a single projection 94 extends radially outwardly more than all of a remainder of the projections 90. This projection 94 helps to perform a handle or grasping member to allow the filter element 46 to be more easily removed from the tank 32.

In reference now to FIGS. 5, 6, and 11-13, the flange 42 of the tank 32 has a lid-engaging section 96 and an element engaging section 98. The element engaging section 98 is axially recesses from and radially inward of the lid engaging section 96. The element engaging section 98 has a groove 100 holding a seal member 101 therein. Each of the lid engaging section 96 and element engaging section 98 has a plurality of alternating radially inward protrusions 102 and radially outward depressions 103.

The filter element of the assembly of FIGS. 5-19 is removably positioned in the interior volume 36 of the tank 32 with a portion of the first end cap construction 60 axially against the seal member 101 in the element engaging section 98 of the tank flange 42 and is circumscribed by the lid engaging section 96. The radially outward projections 90 of the first end cap construction 60 are received by the depressions 103 of the lid engaging section 96. The radially inward recesses 91 of the first end cap construction 60 receive the protrusions 102 of the lid engaging section 96.

Figure 6:
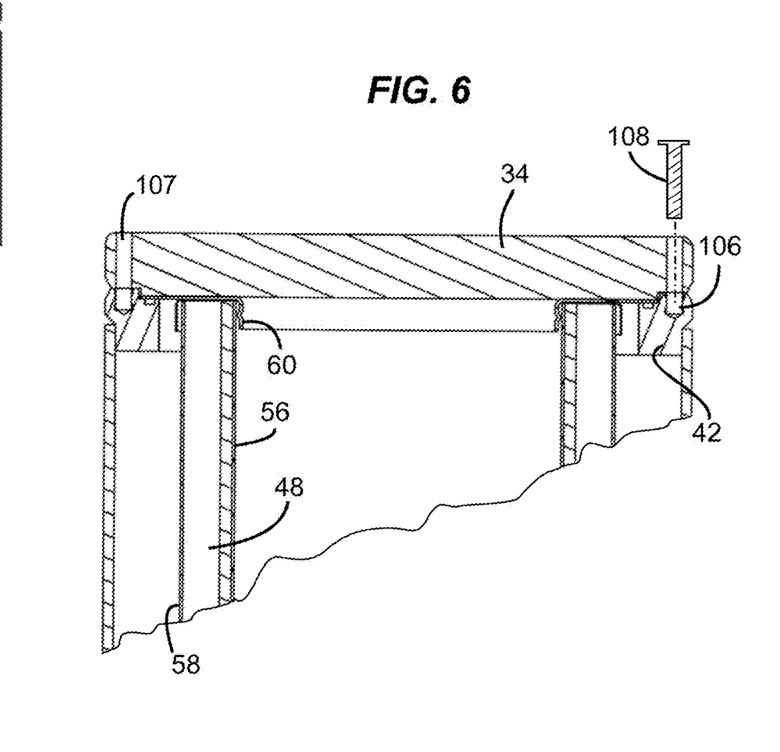
FIG. 6 is another cross-sectional view of the air oil separator assembly of FIG. 5.
Figure 7:
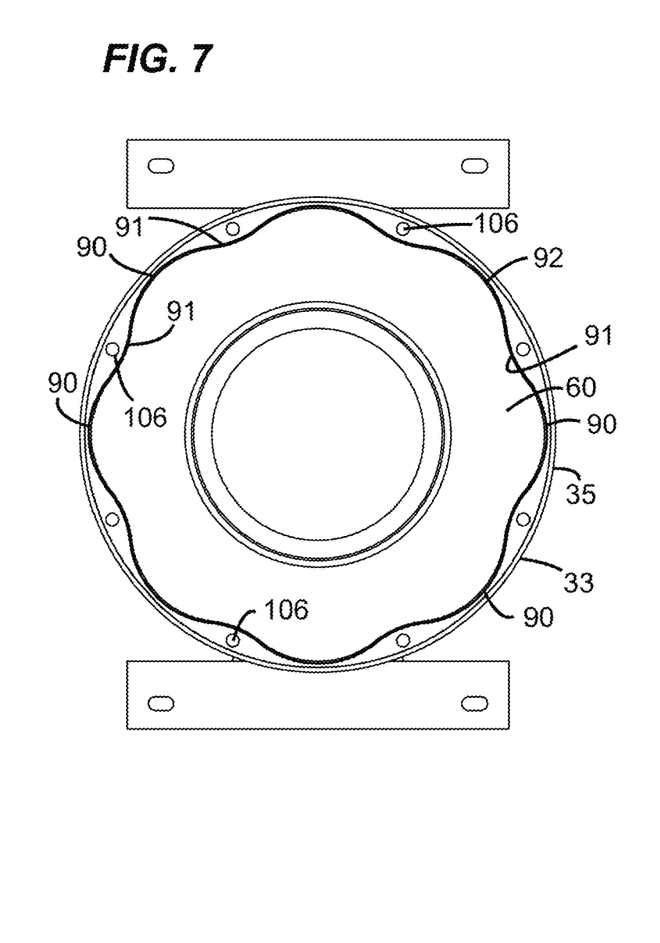
FIG. 7 is a top plan view of the air oil separator assembly of FIGS. 5 and 6 with the cover removed.
Figure 8:
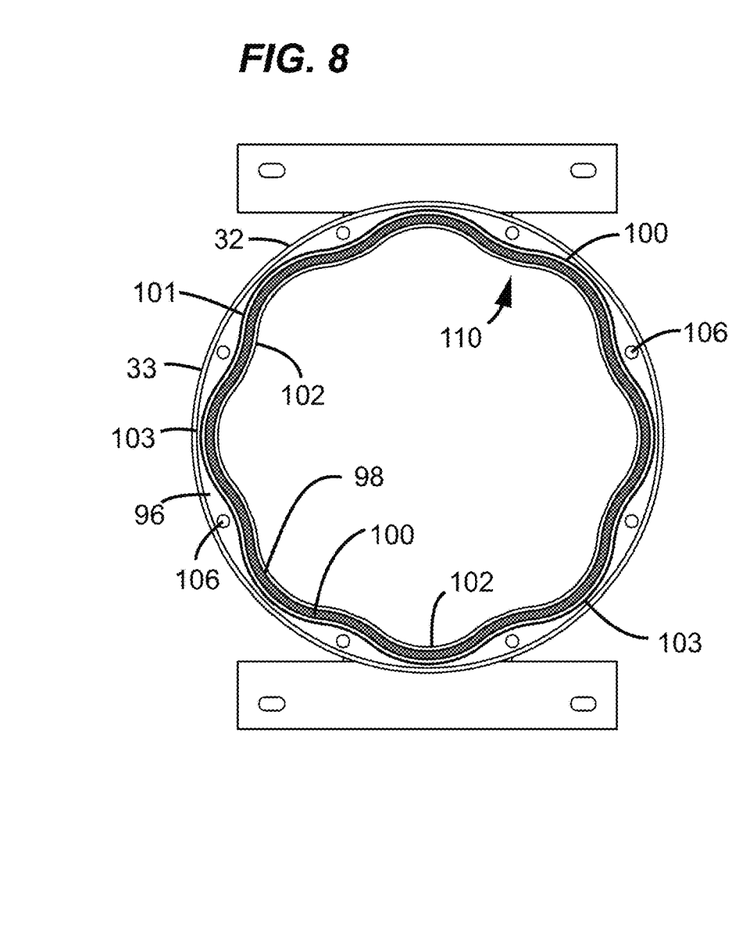
FIG. 8 is a top plan view of the air oil separator assembly of FIGS. 5-7, with the cover and the filter element removed.

As can be seen in FIGS. 6-8, the lid engaging section 96 of the flange 42 includes a plurality of fastener holes 106 in an axial section thereof. The cover 34 includes holes 107 that receive axially extending fasteners, such as bolts 108 removably mounted in the fastener holes 106, 107 to allow the cover 34 to be removably fastened to the tank 32.

As can be seen in FIG. 8, the groove 100 and seal member 101 form a wavy ring 110.

Figure 10:
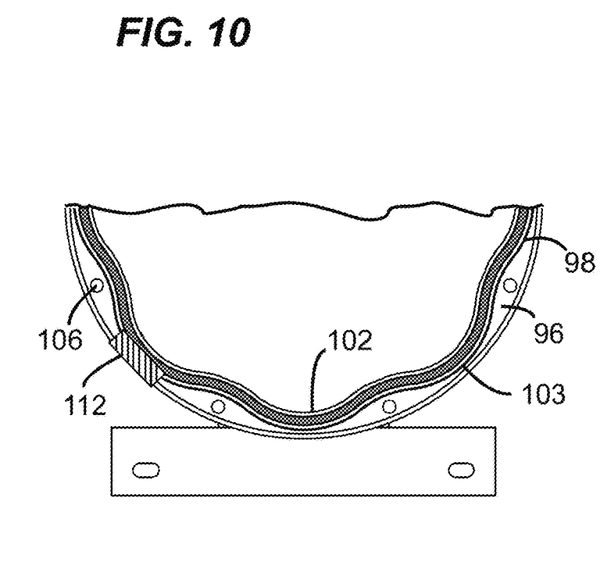
FIG. 10 is a top plan view, similar to FIG. 8, but showing a variation.
Figure 11:
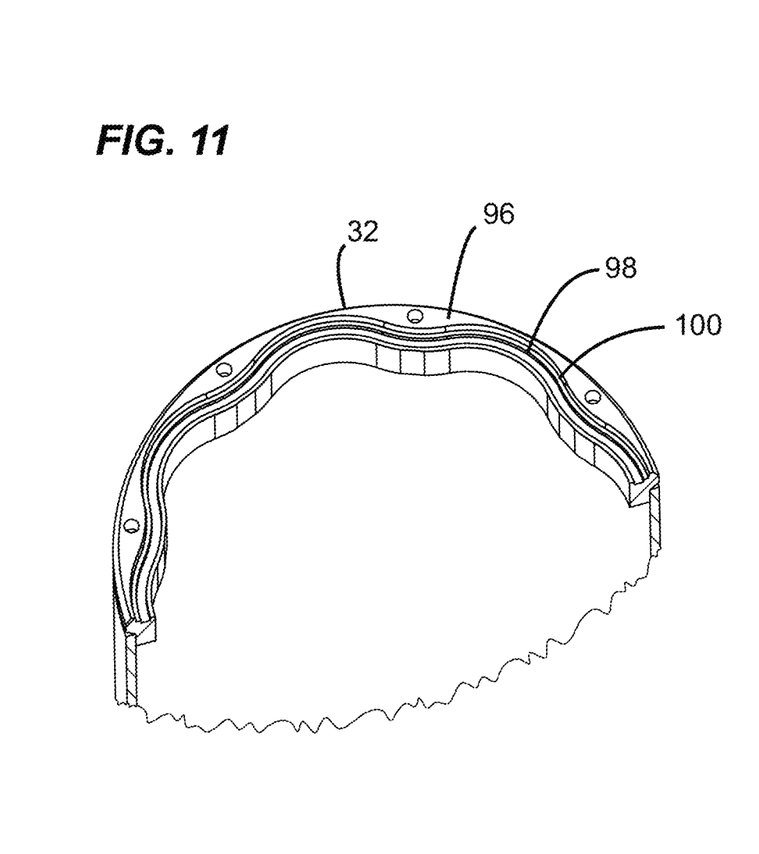
FIG. 11 is a perspective view of a portion of the tank usable in the air oil separator assembly of FIGS. 5 and 6.
Figure 12:
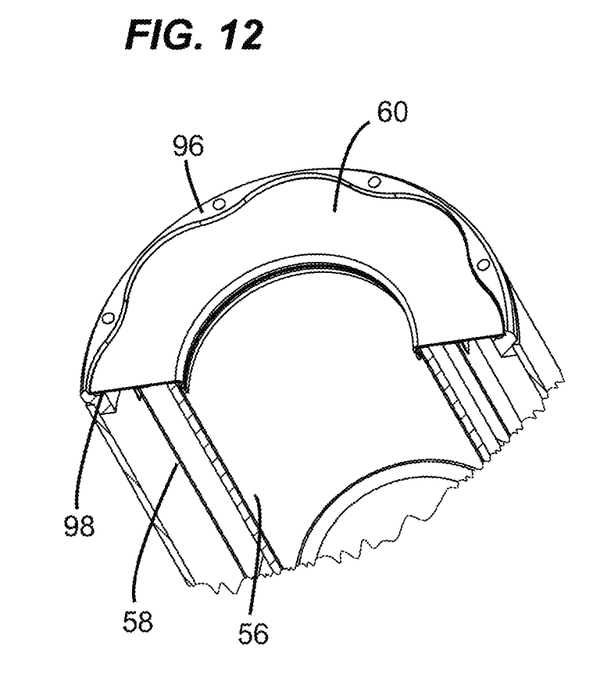
FIG. 12 is a perspective view of a portion of the assembly of FIGS. 5 and 6 and showing the filter element installed in the tank.
Figure 13:
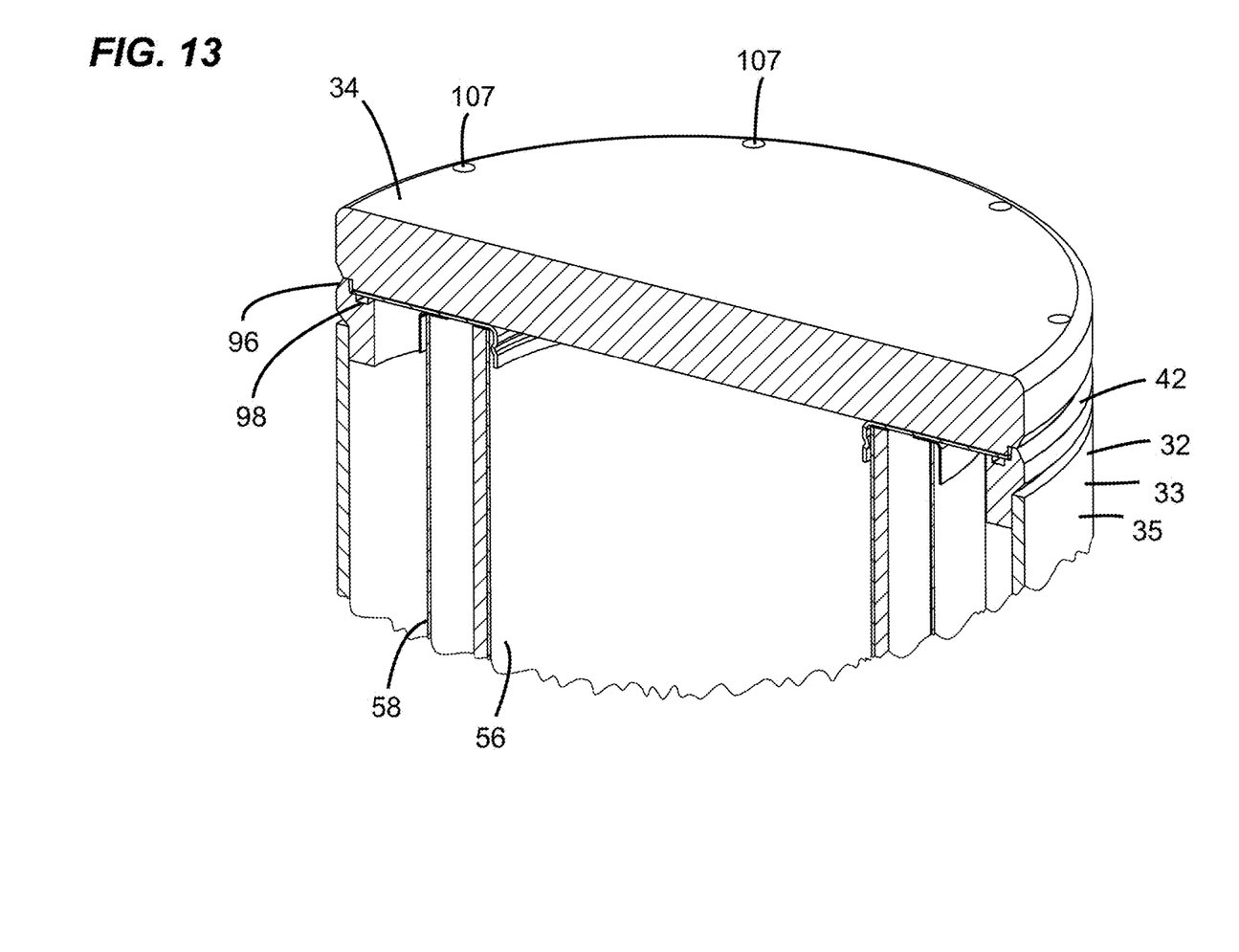
FIG. 13 is a perspective view of a cross section of the air oil separator assembly of FIGS. 5 and 6.
Figure 14:
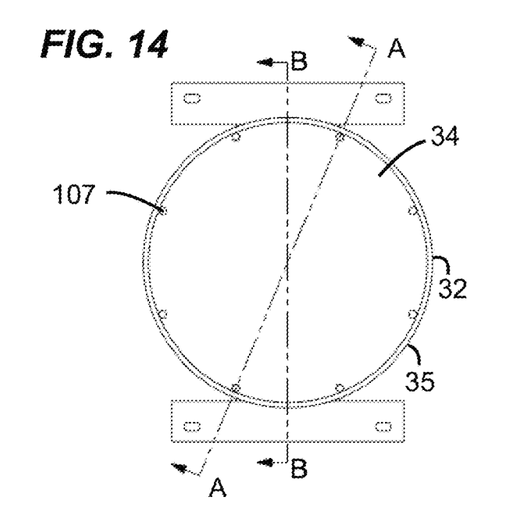
FIG. 14 is a top plan view of the air oil separator assembly of FIGS. 5 and 6.
Figure 15:
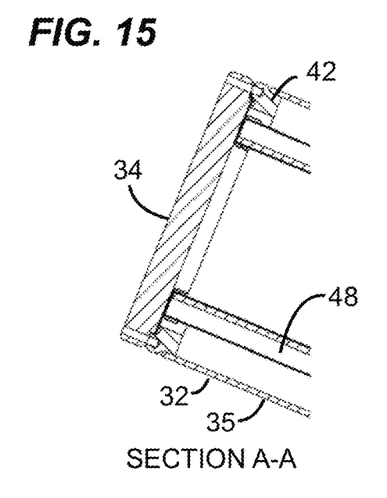
FIG. 15 is a cross-sectional view of the assembly, with the cross section being taken along the line A-A of FIG. 14.
Figure 16:
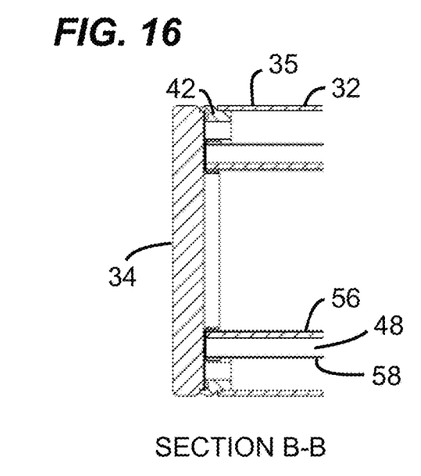
FIG. 16 is a cross-sectional view of the assembly of FIGS. 5 and 6, with the cross section being taken along the line B-B of FIG. 14.
Figure 17:
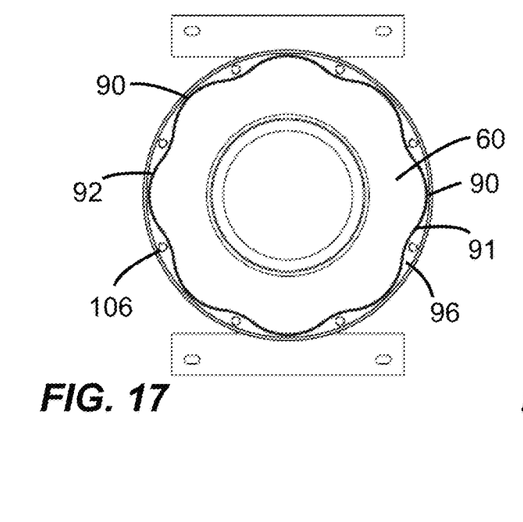
FIG. 17 is a top plan view of the air oil separator assembly with the cover removed.
Figure 18:
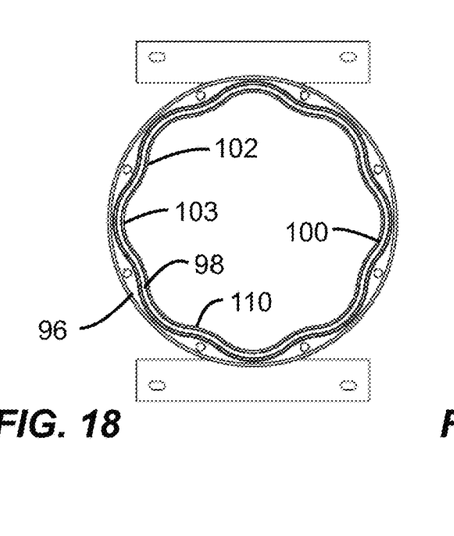
FIG. 18 is a top plan view of the air oil separator assembly with both the cover and the element removed.
Figure 19:
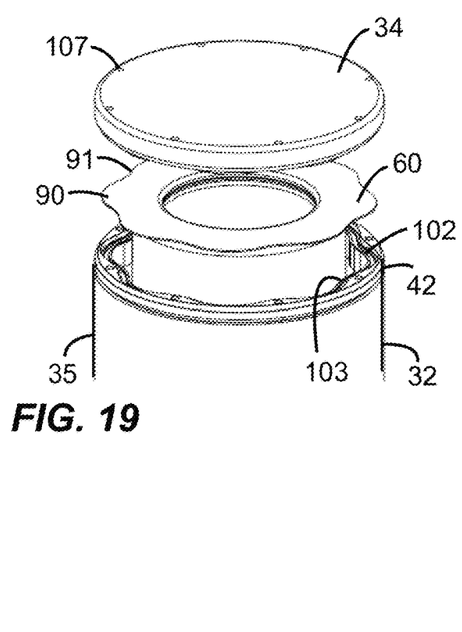
FIG. 19 is an exploded, perspective view of the air oil separator assembly of FIGS. 5 and 6 showing the tank, filter element, and cover.

In FIG. 10, in the embodiment that has the projection 94 extending radially outwardly more than a remainder of the projections 90, the lid-engaging section 96 can have a section 112 that is machined through to allow the protruding projection 94 to extend radially beyond or outside an outer diameter of the wall 35 of the tank 32.

Turning now to the embodiment of FIGS. 20-23, the first end cap construction 60, in this embodiment, includes an outer radial portion 120 including a continuous extension 121 extending radially outwardly from the outer diameter of the filter medial 48. The continuous extension 121 has a first section 122 defining an outer periphery 123 of the extension 121. The continuous extension 121 further includes a second section 124 between the first section 122 and the outer diameter of the filter media 48.

The first section 122 is contained within a plane that is perpendicular to the longitudinal axis 54. The second section 124 slopes from the first section 92 in a direction toward the second end 52 of the filter media 48.

The first end cap construction 60 further includes a centering ring 126. The centering ring 126 is radially inward from the inner diameter of the filter media 48. The central ring 126 defines an opening 128 in communication with the interior 50 of the tubular construction of filter media 48. The centering ring 146 helps to center the cover 34 over the element 46 and tank wall 35.

The flange 42, in this embodiment, has a first radially outward surface 130 and a frusto-conical surface 132. The frusto-conical surface 132 is between the first surface 130 and the inner diameter of the flange 42.

The filter element 46 is positioned in the interior volume 36 with the first section 122 of the first end cap construction 60 being against the first surface 130 of the flange 42. The second section 124 is received by the frusto-conical surface 132 of the flange 42.

The cover 34 is removably mounted on the tank 32 over the mouth 38 to provide selective access to the interior volume 36. The cover 34 has an element engaging side 134 with an axial protrusion 136 extending into and being received by the second section 124 of the first end cap construction 60.

The air oil separator assembly 30 further includes a first seal member 138, which can be an O-ring, between the second section 124 of the first end cap construction 60 and the cover 34. A second seal member 140 can be between the second section 124 of the first end cap construction 60 and the flange 42. In particular, the second seal member 140 can be against the frusto-conical section 132 of the flange 42.

In some alternate embodiments, the first end cap construction 60 can have the centering ring 126 extend further radially inwardly such that it provides all, or at least a portion, of an outlet flow surface 142 of the outlet 45. In the example shown, the outlet flow surface 142 is a curved surface of the cover 34, but in the alternate embodiment, the end cap construction 60 itself would form the curved surface of the outlet 45 and lead to the opening 44 in the cover 34.

Aspects

As is apparent from the above, this disclosure includes the following example aspects or principles, which can be independent of each other or various combinations.

One aspect includes a filter element for an air oil separator; the filter element comprising: a tubular construction of filter media having opposite first and second ends and a longitudinal axis; and a first end cap construction secured to the first end of the filter media; the first end cap construction including a flange-receiving recess therein.

The first end cap construction can include an axial plate and an annular sleeve extending perpendicular from the plate in a direction toward the filter media; the annular sleeve having an outer radial ring and an inner radial ring; the filter media being between the outer radial ring and the inner radial ring.

The recess can be defined by the annular sleeve.

The recess can be defined by the outer radial ring.

The recess can be a longitudinally extending recess generally parallel to the longitudinal axis.

The recess can be defined by the axial plate.

The axial plate can have an upper surface and an opposite lower surface, the lower surface facing the filter media; and the recess can be a continuous ring in the lower surface of the plate.

The upper surface of the plate can include an axially extending rib forming a continuous ring.

The recess may have a cross-section with a shape of any one of: rounded, polygon, trapezoidal, curved, or irregular.

In another aspect, an air oil separator assembly is provided comprising: a tank with a surrounding wall defining an interior volume, an open mouth in communication with the interior volume, and a closed bottom; the tank further including, an inlet extending through the wall; a lower liquid sump in the interior volume held by the closed bottom; and a flange circumscribing the mouth; the flange having a projection therefrom; a cover removably mounted on the tank over the mouth to provide selective access to the interior volume; and the filter element as variously characterized above removably positioned in the interior volume; the projection on the flange of the tank extending into the flange-receiving recess of the first end cap construction.

The air oil separator assembly can further comprise a first seal member between and against the flange of the tank and the first end cap construction; and a second seal member between and against the first end cap construction and the cover.

The first end cap construction can include an axial plate and an annular sleeve extending perpendicular from the plate in a direction toward the filter media; the annular sleeve having an outer radial ring and an inner radial ring; the filter media being between the outer radial ring and the inner radial ring; and the recess is a longitudinally extending recess parallel to the longitudinal axis and is defined by the outer radial ring; and the projection on the flange extends radially inwardly into the mouth.

The first end cap construction can include an axial plate and an annular sleeve extending perpendicular from the plate in a direction toward the filter media; the annular sleeve having an outer radial ring and an inner radial ring; the filter media being between the outer radial ring and the inner radial ring; the axial plate has an upper surface and an opposite lower surface, the lower surface facing the filter media; the recess being a continuous ring in the lower surface of the plate; and the projection on the flange extends axially upwardly into the continuous ring of the recess.

The upper surface of the plate can include an axially extending rib forming a continuous ring; and the cover includes a continuous recess receiving the rib of the upper surface of the plate.

The projection on the flange can have a cross-section with a shape of any one of: rounded, polygon, trapezoidal, curved, or irregular.

In another aspect, a filter element for an air oil separator is provided comprising: a tubular construction of filter media having opposite first and second ends and a longitudinal axis; and a first end cap construction secured to the first end of the filter media; the first end cap construction including a plurality of alternating radially outward projections and radially inward recesses.

The first end cap construction can include an axial plate and an annular sleeve extending perpendicular from the plate in a direction toward the filter media; the annular sleeve having an outer radial ring and an inner radial ring; the filter media being between the outer radial ring and the inner radial ring.

The alternating projections and recesses can be along a radial outer periphery of the axial plate.

The projections and recesses can be curved surfaces.

At least one of the projections can extend radially outwardly more than a majority of a remainder of the projections.

Only one of the projections may extend radially outwardly more all of a remainder of the projections.

In another aspect, an air oil separator assembly is provided and comprises a tank with a surrounding wall defining an interior volume, an open mouth in communication with the interior volume, and a closed bottom; the tank further including, an inlet extending through the wall; a lower liquid sump in the interior volume held by the closed bottom; and a flange circumscribing the mouth; the flange having a lid-engaging section and an element engaging section; the element engaging section being axially recessed from and radially inward of the lid-engaging section; the element engaging section having a groove holding a seal member therein; each of the lid engaging section and element engaging section having a plurality of alternating radially inward protrusions and radially outward depressions; a cover removably mounted on the lid-engaging section of the tank flange over the mouth to provide selective access to the interior volume; and the filter element as variously characterized above is removably positioned in the interior volume with a portion of the first end cap construction axially against the seal member in the element engaging section of the tank flange, and being circumscribed by the lid engaging section; the radial outward projections of the first end cap construction being received by the depressions in the lid engaging section; and the radial inward recesses of the first end cap construction receiving the protrusions of the lid engaging section.

The lid engaging section can include a plurality of fastener holes in an axial section thereof; and the cover includes axially extending fasteners removably mounted in the fastener holes.

The groove and seal member can form a wavy ring.

Another aspect is directed to a filter element for an air oil separator. The filter element can include a tubular construction of filter media having opposite first and second ends and a longitudinal axis; and a first end cap construction secured to the first end of the filter media; the first end cap construction having an outer radial portion including: a continuous extension extending radially outwardly from an outward diameter of the filter media; the continuous extension having a first section defining an outer periphery of the extension and a second section between the first section and the outer diameter of the filter media; the first section being contained within a plane perpendicular to the longitudinal axis; and the second section sloping from the first section in a direction toward the second end of the filter media.

The first end cap construction can further include a centering ring radially inward from an inner diameter of the filter media; the centering ring defining an opening in communication with an interior of the tubular construction of filter media.

The filter element can further include a closed second end cap secured to the second end of the filter media.

In another aspect, an air oil separator assembly is provided including a tank with a surrounding wall defining an interior volume, an open mouth in communication with the interior volume, and a closed bottom; the tank further including, an inlet extending through the wall; a lower liquid sump in the interior volume held by the closed bottom; and a flange circumscribing the mouth; the flange having a first radially outward surface and a frusto-conical surface; the frusto-conical surface being between the first surface and an inner diameter of the flange; the filter element of any one of aspects 25-57 positioned in the interior volume with the first section of the first end cap construction being against the first surface of the flange; and the second section of the first end cap construction being within a received by the frusto-conical surface of the flange; and a cover removably mounted on the tank over the mouth to provide selective access to the interior volume; the cover having an element engaging side with an axial protrusion extending into and being received by the second section of the first end cap construction.

The air oil separator assembly can further include a first seal member between the second section of the first end cap construction and the cover; and a second seal member between the second section of the first end cap construction and the flange.

The above represents example principles. Many embodiments can be made according to these principles.

What is claimed is:

1. A filter element for an air oil separator; the filter element comprising:
   (a) a tubular construction of filter media having opposite first and second ends and a longitudinal axis;
   (b) a first end cap construction secured to the first end of the filter media; the first end cap construction including a flange-receiving recess therein; the first end cap construction including an axial plate and an annular sleeve extending perpendicular from the plate in a direction toward the filter media; the annular sleeve having an outer radial ring and an inner radial ring; the filter media being between the outer radial ring and the inner radial ring; and
      (i) the outer radial ring defining the recess; the recess being a groove within the outer radial ring; the groove extending continuously from the axial plate to a free end of the outer radial ring in a direction parallel to the longitudinal axis.

2. The filter element of claim 1 wherein the recess has a cross-section with a shape of any one of: rounded, polygon, trapezoidal, curved, or irregular.

3. A filter element for an air oil separator; the filter element comprising:
   a tubular construction of filter media having opposite first and second ends and a (a) longitudinal axis;
   (b) a first end cap construction secured to the first end of the filter media; the first end cap construction including a flange-receiving recess therein; the first end cap construction includes an axial plate; wherein the recess is defined by the axial plate;
   the axial plate having an upper surface and an opposite lower surface, the lower surface (c) facing the filter media;
   (d) the recess being a continuous ring in the lower surface of the plate; the recess being radially spaced from each of the filter media and an outer periphery of the axial plate; and
   (e) the upper surface of the plate including an axially extending rib forming a continuous ring; a lower surface of the rib defining the recess.

4. A filter element for an air oil separator; the filter element comprising:
   (a) a tubular construction of filter media having opposite first and second ends and a longitudinal axis; and
   (b) a first end cap construction secured to the first end of the filter media; the first end cap construction including a plurality of alternating radially outward projections and radially inward recesses;
   wherein at least one of the projections extends radially outwardly more than a majority of a remainder of the projections.

5. The filter element of claim 4 wherein the first end cap construction includes an axial plate and an annular sleeve extending perpendicular from the plate in a direction toward the filter media; the annular sleeve having an outer radial ring and an inner radial ring; the filter media being between the outer radial ring and the inner radial ring.

6. The filter element of claim 5 wherein the alternating projections and recesses are along a radial outer periphery of the axial plate.

7. The filter element of claim 4, wherein the projections and recesses are curved surfaces.

8. The filter element of claim 4 wherein only one of the projections extends radially outwardly more than all of a remainder of the projections.

* * * * *